United States Patent
Wang et al.

(10) Patent No.: US 11,673,780 B2
(45) Date of Patent: Jun. 13, 2023

(54) MULTI-FUNCTION CAMERA SYSTEM

(71) Applicant: AUTOEQUIPS TECH CO., LTD., New Taipei (TW)

(72) Inventors: Ting-Peng Wang, New Taipei (TW); I-Jen Lai, New Taipei (TW)

(73) Assignee: AUTOEQUIPS TECH CO., LTD., New Taipei (TW)

( * ) Notice: Subject to any disclaimer, the term of this patent is extended or adjusted under 35 U.S.C. 154(b) by 418 days.

(21) Appl. No.: 16/777,382

(22) Filed: Jan. 30, 2020

(65) Prior Publication Data

US 2020/0247651 A1    Aug. 6, 2020

(30) Foreign Application Priority Data

Feb. 1, 2019   (TW) ................................ 108201699

(51) Int. Cl.
*B66F 9/075* (2006.01)
*G05D 1/02* (2020.01)
*H04N 23/57* (2023.01)

(52) U.S. Cl.
CPC ........ *B66F 9/0755* (2013.01); *B66F 9/07504* (2013.01); *G05D 1/0246* (2013.01); *H04N 23/57* (2023.01); *G05D 2201/0216* (2013.01)

(58) Field of Classification Search
CPC . B66F 9/0755; B66F 9/07504; G05D 1/0246; G05D 2201/0216; H04N 5/2257; H04N 5/2254; H04N 5/2354; H04N 5/262; G03B 15/03; G03B 29/00; G03B 15/00; G06T 7/80

See application file for complete search history.

(56) References Cited

U.S. PATENT DOCUMENTS

2003/0019934 A1* 1/2003 Hunter ............... G06K 7/10732
                                                        235/462.2
2017/0212517 A1* 7/2017 Houle .................. B60W 10/18

FOREIGN PATENT DOCUMENTS

| CN | 205642738 U | 10/2016 |
| CN | 205754547 U | 11/2016 |
| CN | 207364595 U | 5/2018 |
| JP | H0554496 U | 7/1993 |
| JP | 2006096457 A | 4/2006 |
| JP | 2011195334 A | 10/2011 |
| KR | 101600980 | * 3/2016 |
| KR | 20180114506 A | 10/2018 |

* cited by examiner

*Primary Examiner* — Jeff A Burke
*Assistant Examiner* — Sihar A Karwan
(74) *Attorney, Agent, or Firm* — Rabin & Berdo, P.C.

(57) ABSTRACT

A multi-function camera system, applied to a forklift truck, includes a camera device and a display device installed on the forklift truck, and an image processing unit coupled between the camera device and the display device, capable of shooting and displaying a corresponding real image in order to assist operations of the forklift truck. In addition, the camera device is equipped with a fill light module capable of providing multiple light colors, and the image processing unit includes an identification module capable of identifying the optical identification code. Accordingly, the camera system with multiple functions of monitoring, fill light, identification and positioning etc. is achieved.

14 Claims, 9 Drawing Sheets

MULTI-FUNCTION CAMERA SYSTEM

BACKGROUND OF THE INVENTION

1. Technical Field

The present invention relates to a vehicle camera surveillance field, in particular, to a multi-function camera system applied to a forklift truck and capable of providing different observation viewing angles and providing functions of multi-color fill flight, product identification and positioning etc.

2. Description of Related Art

Forklift trucks, also known as forklift, are industrial vehicles commonly seen in places of factories and warehouses, and they can be used to perform operations of loading and unloading of merchandise placed on pallets, stacking or short-distance transportation etc. Generally, in such working environment, merchandise are mostly packaged in boxes, and when an operator is transporting merchandise, under the condition where the content of the merchandise boxes is unknown, he or she often needs to use other instruments to verify the merchandise before operating the forklift truck to transport such merchandise. Consequently, there is a need to improve the operation efficiency.

In addition, generally, during the operation of a forklift, the operator often cannot observe the pallet fork, also known as fork, at the lower portion of the front side of the vehicle at appropriate viewing angle, such that he or she needs to make repetitive adjustments in order to align with the pallet. Although it is known that camera and display can be used to assist the operator in the observation of the pallet fork, nonetheless, since warehouse environments are mostly dark, and the stacking of merchandise can hinder the vision and lighting, the current condition of use of a forklift truck is still quite inconvenience to operators. In view of the above, through extensive research and development as well as concepts and tests, the inventor of the present invention seeks to provide a solution capable of overcoming.

BRIEF SUMMARY OF THE INVENTION

A primary objective of the present invention is to provide a multi-function camera system applied to a forklift truck. During the providing of auxiliary surveillance image, the system is able to automatically scan an optical identification code in the camera image in order to allow an operator to obtain the information of merchandise directly during the operation of the forklift truck, thereby increasing the operation efficiency.

Another objective of the present invention is to provide a multi-function camera system applied to a forklift truck, and such system is able to provide different color of illumination light (multi-color fill light) according to the environmental needs, thereby ensuring the convenience and safety during operation.

Still another objective of the present invention is to provide a multi-function camera system applied to a forklift truck, and such system is able to provide the function of assisting the pallet fork alignment and positioning according to the user demands. The system provides a physical visual laser positioning or radar positioning on a display screen, thereby increasing the smoothness of the forklift truck operation.

To achieve the foregoing objectives and technical effects, the present invention adopts the technique of providing a camera device arranged at a front side of the forklift truck, a display device arranged on the forklift truck and an image processing unit coupled between the two; wherein the camera device comprises a camera lens and a fill light module; the camera lens is used for shooting a real image in front of the forklift truck; the fill light module is used for providing at least one color of illumination light in a shooting direction of the camera lens; the image processing unit is used for performing an image process on the real image shot by the camera device; the display device is used for displaying the real image shot by the camera device or the real image processed by the image processing unit. Furthermore, the image processing unit includes an identification module; the identification module is used for identifying an optical identification code in the real image shot by the camera device and is connected to a remote database in order to obtain a merchandise information corresponding to the optical identification code, thereby overlaying the merchandise information onto the real image.

According to the aforementioned structure, the fill light module comprises a plurality of fill light lamps arranged at a surrounding of the camera lens.

According to the aforementioned structure, the plurality of fill light lamps are capable of providing different color of lights.

According to the aforementioned structure, the camera device further comprises a laser head for projecting an auxiliary positioning laser beam toward a front thereof.

According to the aforementioned structure, the laser head is a laser head of a point shape, a flat shape or a cross shape in order to project a laser beam of a point, flat shape or cross shape.

According to the aforementioned structure, the image processing unit further comprises a positioning module; the positioning module is used for overlaying a ring radar pattern onto the real image during activation of the laser head.

According to the aforementioned structure, the display device is a monitor capable of displaying an image or a Head Up Display (HUD) capable of displaying an image on a front windshield of the forklift truck.

According to the aforementioned structure, the optical identification code identified by the identification module is any one of one to four dimensional codes.

According to the aforementioned structure, the camera device is arranged on a fork module capable of performing ascending and descending movements at the front side of the forklift truck.

According to the aforementioned structure, the image processing unit is an Electronic Control Unit (ECU).

To facilitate the understanding on the aforementioned objectives, technical effects and features of the present invention, the following provides further details along with the accompanied drawings as follows:

DETAILED DESCRIPTION OF THE INVENTION

Figure 1:
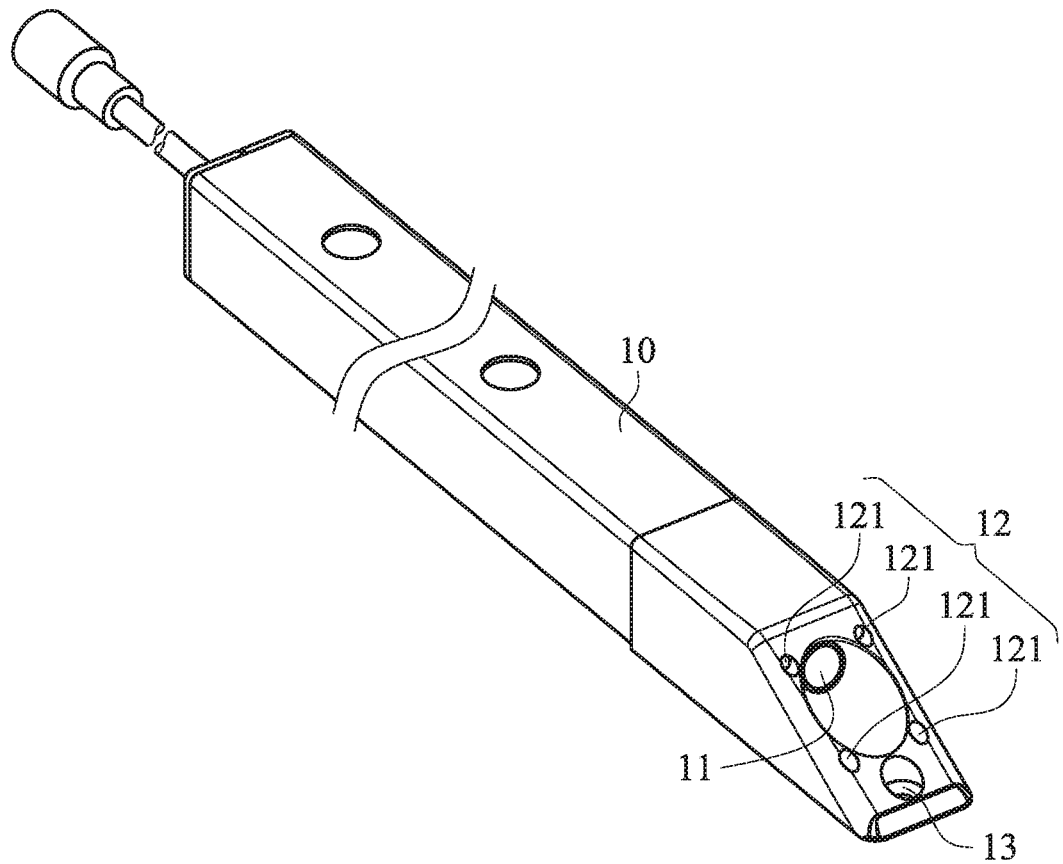
FIG. 1 is an outer appearance view of the camera device according to an embodiment of the present invention.
Figure 2:
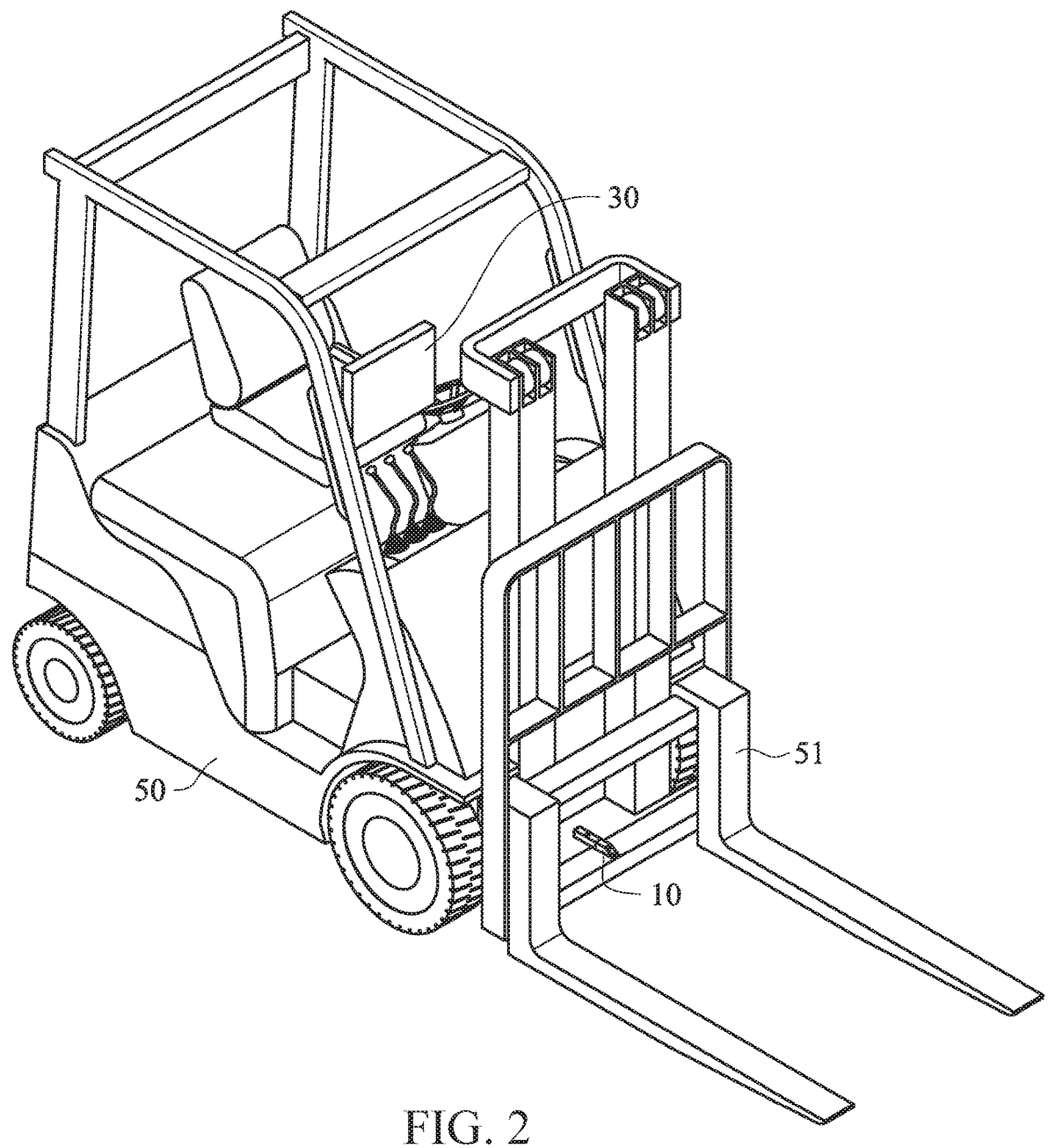
FIG. 2 is a schematic view showing an embodiment of the present invention applied to a forklift truck.
Figure 3:
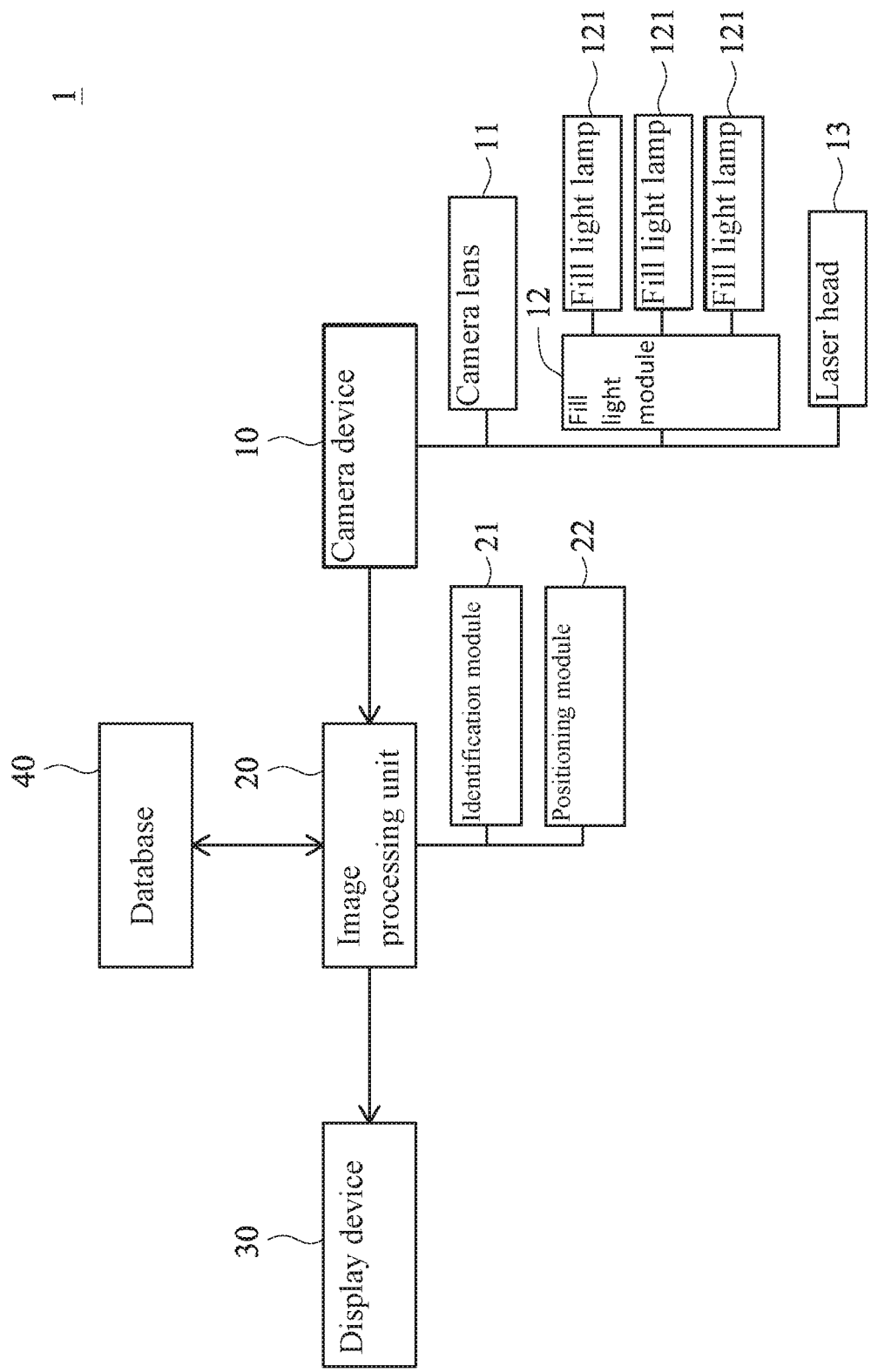
FIG. 3 is a system architecture view of an embodiment of the present invention.

As shown in FIG. 1 to FIG. 3, a main system structure according to an embodiment of the present invention comprises a camera device 10, an image processing unit 20, a display device 30 and a remote database 40. The camera device 10 and the display device 30 are installed on a forklift truck directly. The camera device 10 is installed at a front side of the forklift truck and used for shooting an image at a surrounding of a front fork (pallet fork) directly. In addition, the display device 30 is installed at an appropriate location of the driver's seat and used for displaying the image shot by the camera device 10 and providing it to an operator for observation. The image processing unit 20 can be independently installed on the forklift truck or can be an electronic unit built at the internal of the camera device 10 or the display device 30, such as an Electronic Control Unit (ECU) for vehicle use, which is mainly coupled between the camera device 10 and the display device 30 and is further connected to the remote database 40.

The camera device 10 is mainly installed at an appropriate location at the front side of the forklift truck 50, and its front end is installed with a camera lens 11 for shooting a real image of the front fork of the forklift truck 50 and the surrounding thereof. In this embodiment, the camera device 10 is installed on a fork module 51 capable of performing ascending and descending movements at the front side of the forklift truck 50, and its height is approximately equivalent to the two forks extended forward. When the fork module 51 performs the ascending and descending movements, the camera device 10 is able to ascend and descend together with the fork module 51 synchronously in order to continuously shoot images of the fork and the surrounding at the front side thereof, allowing the operator to observe the fork status from the display device 30 at any time in order to achieve the effect of assisting the observation made by the operator.

In this embodiment, the front end of the camera device 10 further includes a plurality of fill light lamps 121 and a laser head 13. The plurality of fill light lamps 121 form a fill light module 12 for providing illumination light toward the front (shooing direction) of the camera lens 11 such that fill light can be provided under an environment with insufficient lighting in order to allow the shooting of the real image to be maintained with a certain clearness and brightness. The plurality of fill light lamps 121 are arranged to surround the locations at the perimeter of the camera lens 11 respectively, and depending upon the needs, each fill light lamp 121 can be configured into a light source capable of providing different color of illuminating light, such as white light for conventional fill light or yellow light, blue light and infrared light etc. applicable to special environments, in order to be applicable to environments or demands of greater diversity.

The laser head 13 is located at a lower edge of the camera lens 11 and used for projecting a visible laser beam toward the front. The laser beam projected is able to indicate a visible mark on an object at the front, thereby allowing the operator to directly observe the laser beam or mark in order to auxiliary determine the current horizontal height of the fork of the fork module 51, facilitating the operation of the forklift truck 50.

The image processing unit 20 is coupled between the camera device 10 and the display device 30, and it is mainly used to receive the real image shot by the camera device 10. A panorama or wide-angle real image is corrected into a plane image through appropriate curve profile correction, followed by providing it to the display device 30 for display. Typically, the image processing unit 20 includes a built-in program provided to allow the operator to perform corresponding image processing during the operation, such as the movement and scale adjustment etc. on the image in the display screen. For the image processing unit 20 illustrated in an embodiment of the present invention, it further comprises an identification module 21 and a positioning module 22. The identification module 21 is able to identify an optical identification code from the real image. Through the connection to a remote database 40 and analysis, corresponding merchandise information can be obtained, following which the merchandise information is overlaid onto the real image to be displayed, thereby allowing the operator to obtain the merchandise information in the display screen directly. The positioning module 22 is to overlay a radar pattern of a generally ring shape onto the real image during the controlled activation of the laser head 13, in order to assist the operator to identify the laser mark swiftly from the display screen or to use the overlaying laser pattern directly as the basis for auxiliary determination of the current horizontal height of the fork.

Figure 4:
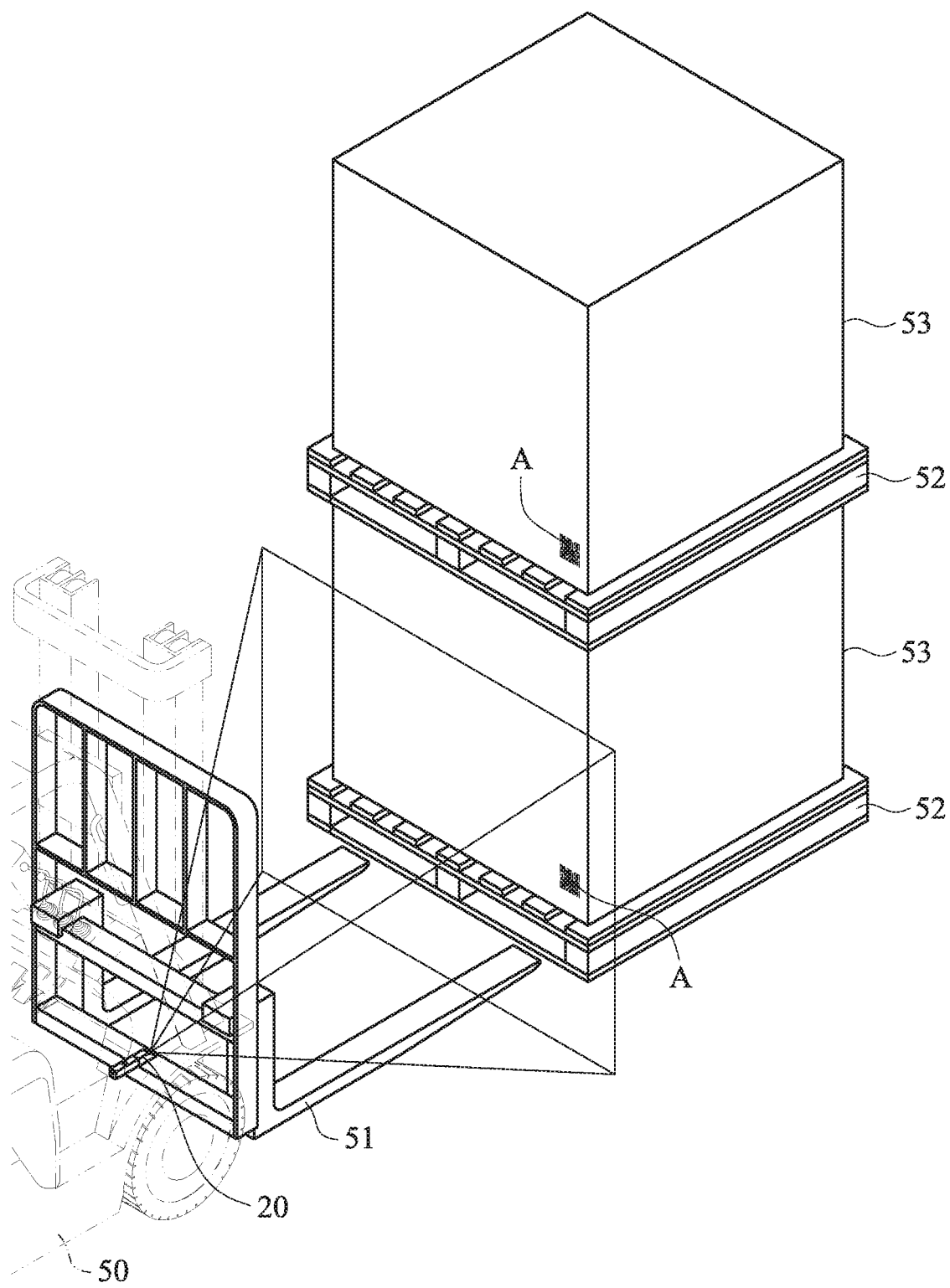
FIG. 4 is a schematic view showing a state of use of an embodiment of the present invention.
Figure 5A:
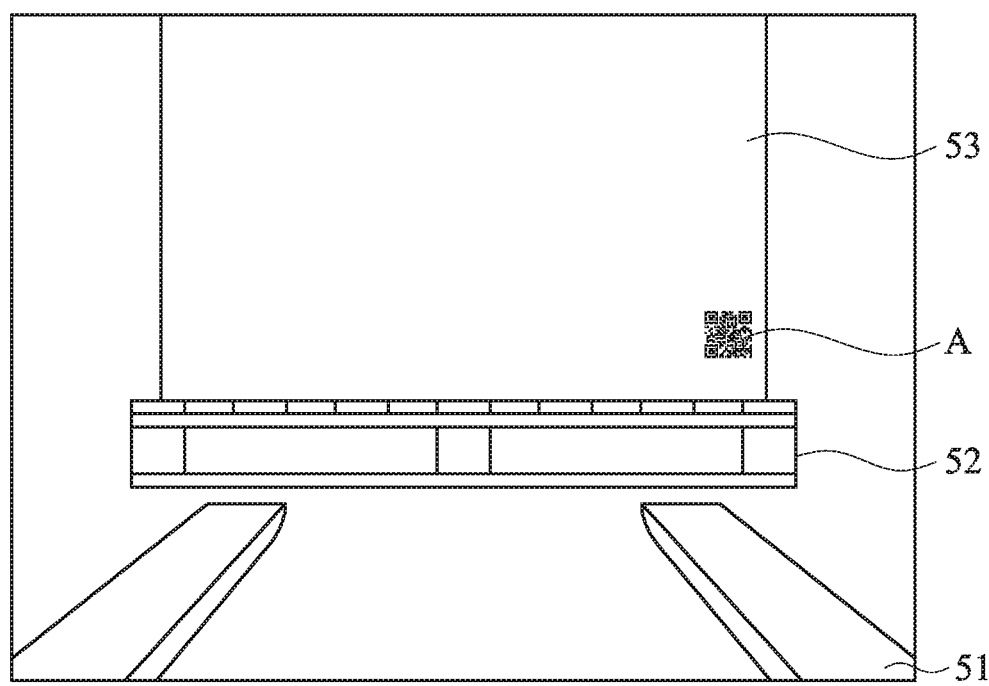
FIG. 5a and FIG. 5b are schematic views of the real image and the optical identification code corresponding to FIG. 4.
Figure 5B:
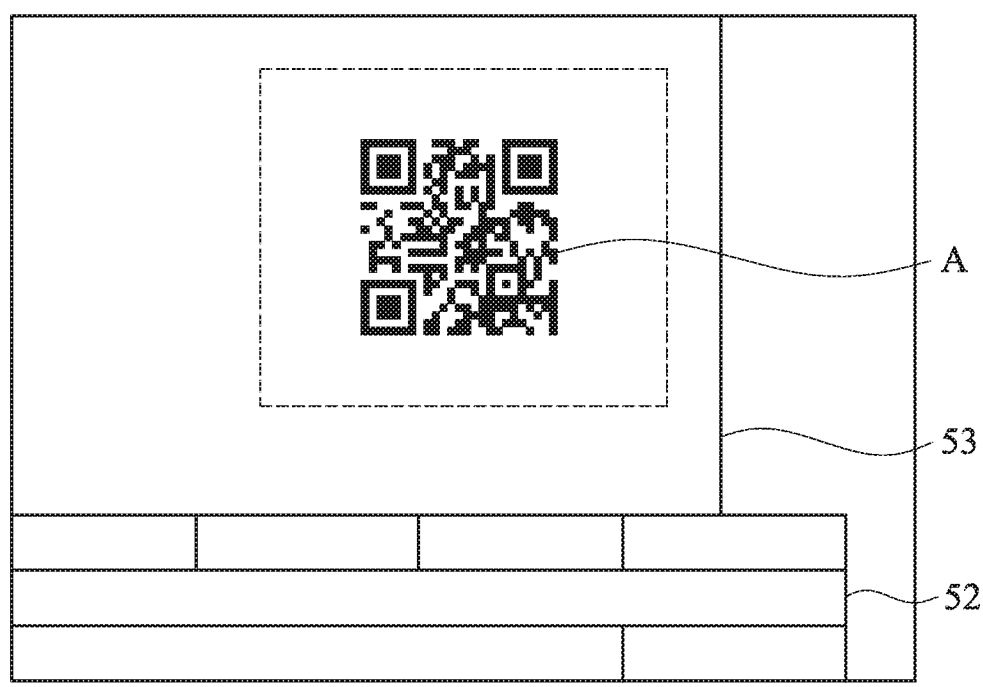

Please refer to FIG. 4 to FIG. 9. During the actual use of this embodiment, the camera device 10 on the fork module 51 of the forklift truck 50, as shown in FIG. 4, is able to shoot a real image (i.e. as shown in FIG. 5a) including the fork extended forward and a certain range at the front thereof. The identification module 21 of the image processing unit 20 is able to continuously monitor the real image. When it approaches a pallet 52 and reaches a certain distance from the merchandise 53, the identification module 21 is able to determine the optical identification code A in the real image. At this time, it is able to perform scanning of the optical identification code A (i.e. as shown in FIG. 5b, it is partially zoomed in during the scanning, and it is zoomed out after the scanning) Next, it is connected to the database 40 in order to analyze the optical identification code A and obtain the corresponding merchandise information in order to display the merchandise information and the real image together on the display device 30. Consequently, when the operator is operating the forklift truck 50, he or she is able to perform confirmation on the merchandise directly, thereby simplifying the process of merchandise identification and preventing errors in the transportation of merchandise.

In a feasible embodiment, the optical identification code A identifiable by the identification module 21 can be an one-dimensional code (such as barcode), a two-dimensional code (such as QR code, Quick Response Code), a three-dimensional code (further including the color information) or a four-dimensional code (further including the time information) depending upon the needs of device installation.

Figure 6:
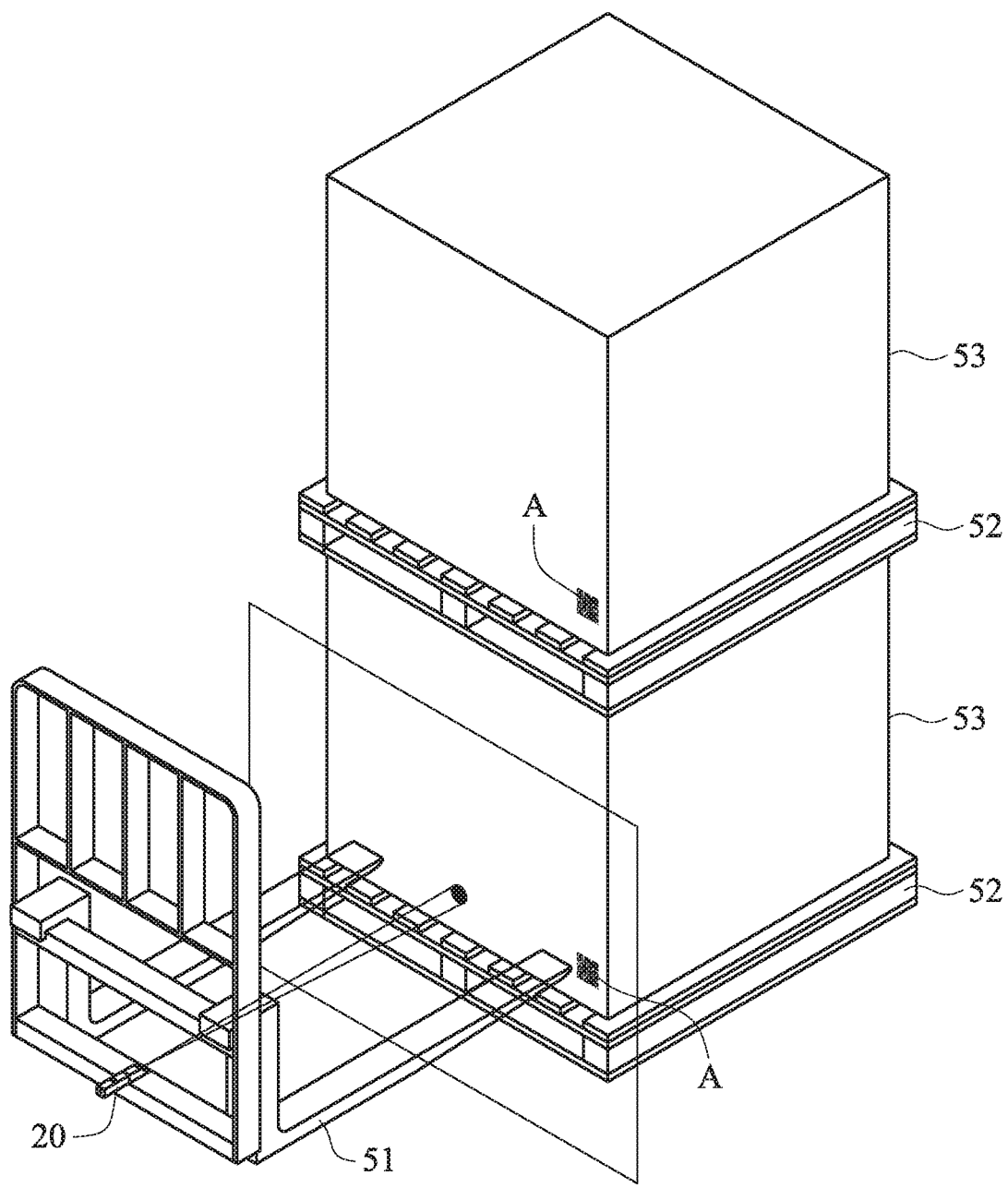
FIG. 6 is a schematic view showing the use of a single point laser to assist the positioning.
Figure 7:
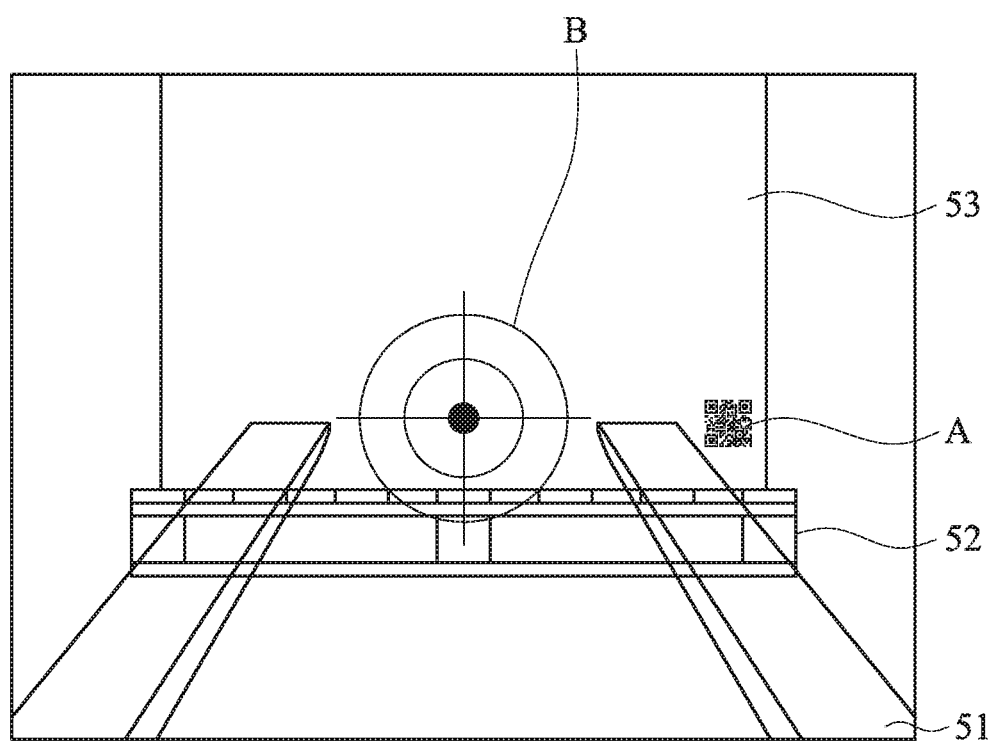
FIG. 7 is a schematic view showing the positioning module overlaying the radar pattern onto the real image.

During the operation the forklift truck 50, when the environment or place is not suitable for direct observation, the operator can use the screen (real image) displayed on the display device 30 to determine the condition of the fork and the relative position directly. When the lighting in the environment or place is poor, the fill light module 12 can also be activated to turn on the fill light lamps 121 of suitable light color to illuminate the area at the front, thereby providing excellent brightness to the image shot by the camera device 10 for the operator's observation. In addition, when the operator is operating the fork module 51 to align with the pallet 52, he or she can activate the positioning module 22 and the laser head 13 depending upon the needs. When it is activated, the laser head 13 is able to project a laser beam toward the front directly, as shown in FIG. 6, and the operator is able to observe the laser beam directly in order to determine the horizontal height of the extended fork of the fork module 51 according to laser beam and the mark indicated on the object at the front. Consequently, the difficulty in the alignment operation of the fork module 51 can be simplified. Moreover, the positioning module 22 is to provide the function of auxiliary positioning on the display screen of the display device 30, and it mainly overlays a simple radar pattern onto the real image, as shown in FIG. 7, in order to be displayed together with the real image shown by the display device 30. As a result, the operator is able to identify the laser mark from the display screen swiftly or to use the overlaid radar pattern directly to assist the determination of the horizontal height of the fork as an alignment basis, thereby simplifying difficulties encountered during the operation.

Figure 8:
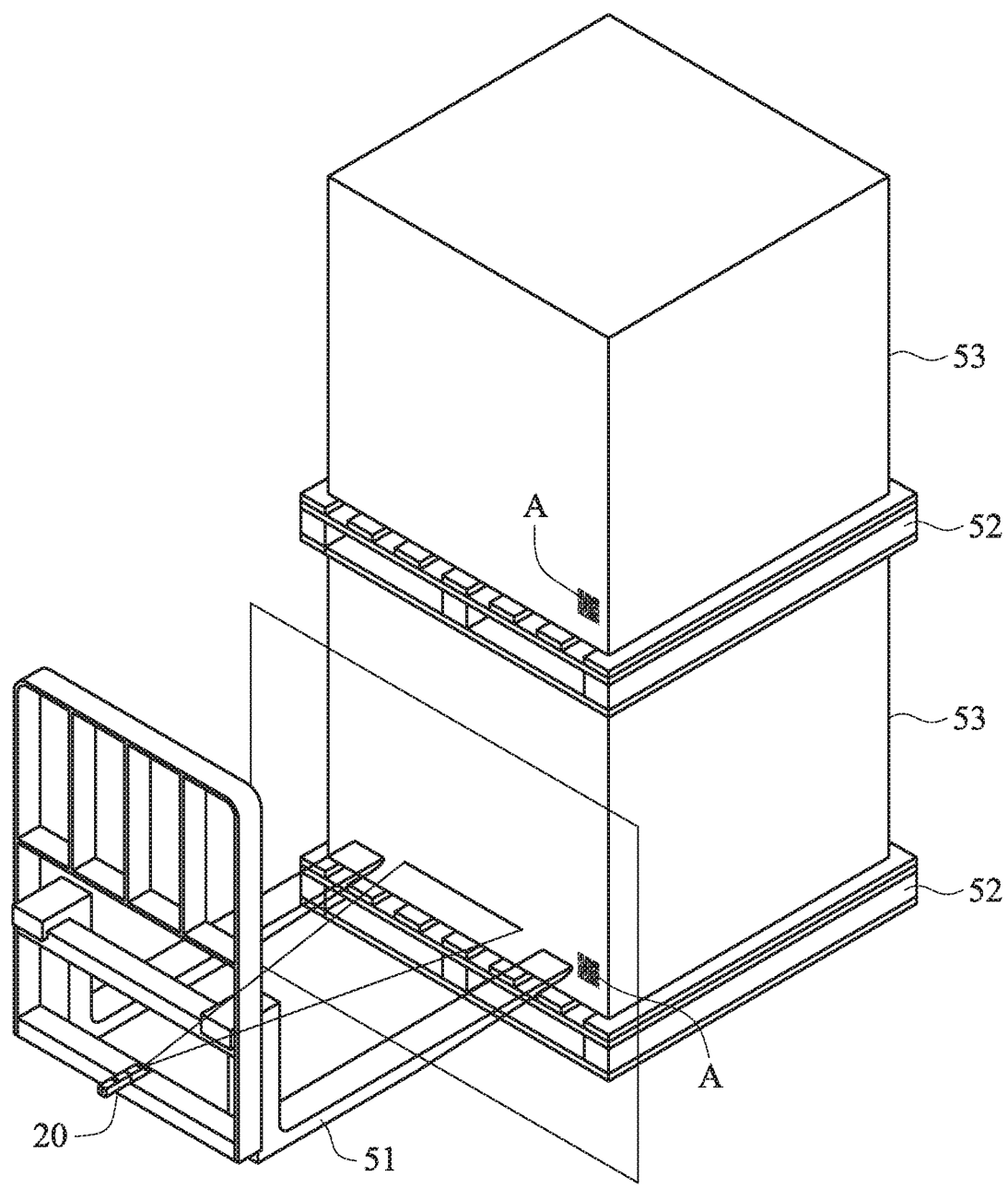
FIG. 8 is a schematic view showing the use of a flat shape laser to assist the positioning.
Figure 9:
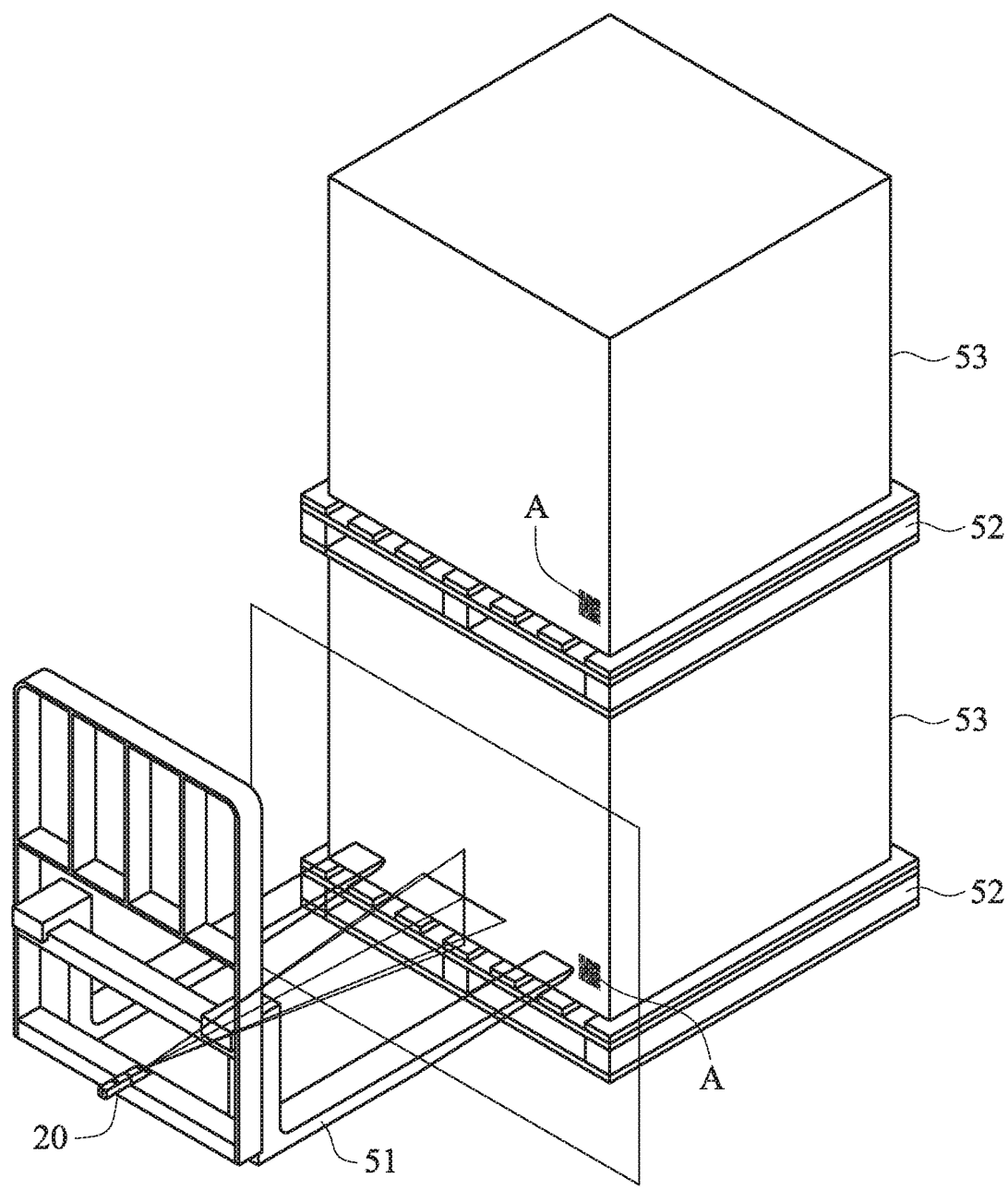
FIG. 9 is a schematic view showing the use of a cross shape laser to assist the positioning.

Furthermore, in an embodiment of the present invention, in addition to a single point laser head, the laser head 13 can also use a flat shape (as shown in FIG. 8, a horizontal beam of a flat shape) or a cross shape (as shown in FIG. 9) laser head 13 in order to further assist the operator to perform direct observation. Moreover, the display device 30, typically, can be a monitor capable of displaying an image, and according to the actual needs and configuration, a Head Up Display (HUD) can also be used in order to increase the operational safety.

In view of the above, the present invention provides diverse functions and is capable of increasing the convenience and safety of the forklift truck operation; therefore, the present invention discloses a creation with patentability and a patent application is submitted according to the law. Nevertheless, it shall be understood that the content of the above description is provided to illustrate the preferred embodiments of the present invention only such that it shall not be treated as limitations to the scope of the claim of the present invention. In addition, any simple modification and equivalent structural changes made based on the content of the specification and drawings of the present invention shall also be treated to be within the scope of the claim of the present invention.

What is claimed is:

1. A multi-function camera system of a forklift truck, the multi-function camera system comprising:
    a camera device of an elongated shape, arranged at a front side and on a fork module of the forklift truck to thereby ascend and descend with the fork module, the camera device comprising, at a frond end thereof:
        a camera lens positioned to continuously shoot real images of a pallet fork of the forklift truck and any object loaded on the pallet fork,
        a fill light module used for providing illumination light of at least one color in a shooting direction of the camera lens,
        a plurality of fill light lamps arranged at a surrounding of the camera lens, and configured to provide illuminating light, and
        a laser head for projecting an auxiliary positioning laser beam, the laser head being positioned at substantially a same height as an extended fork of the fork module, such that an operator of the forklift truck determines the height of the extended fork based on a mark of the auxiliary positioning laser beam projected by the laser head;
    an image processing unit coupled to the camera device and used for performing image processing on the real images shot by the camera device;
    a display device arranged on the forklift truck and coupled to the image processing unit, used for continuously displaying the real images shot by the camera device or processed by the image processing unit, wherein
    the image processing unit includes an identification module, the identification module being configured to
        continuously monitor the real images to identify an optical identification code in the real images shot by the camera device, and
        obtain merchandise information corresponding to the optical identification code from a remote database; and
    the display device is configured to receive the merchandise information from the image processing unit and to continuously display the real images with the merchandise information overlaid thereon.

2. The multi-function camera system according to claim 1, wherein the plurality of fill light lamps are capable of providing lights of different colors.

3. The multi-function camera system according to claim 2, wherein the display device is a monitor capable of displaying an image or a Head Up Display (HUD) capable of displaying an image on a front windshield of the forklift truck.

4. The multi-function camera system according to claim 3, wherein the optical identification code identified by the identification module is any one of one to four dimensional codes.

5. The multi-function camera system according to claim 1, wherein the laser head is a laser head of a point shape, a flat shape or a cross shape.

6. The multi-function camera system according to claim 5, wherein the display device is a monitor capable of displaying an image or a Head Up Display (HUD) capable of displaying an image on a front windshield of the forklift truck.

7. The multi-function camera system according to claim 6, wherein the optical identification code identified by the identification module is any one of one to four dimensional codes.

8. The multi-function camera system according to claim 1, wherein the image processing unit further comprises a positioning module; the positioning module is used for overlaying a ring radar pattern onto the real image during activation of the laser head.

9. The multi-function camera system according to claim 8, wherein the display device is a monitor capable of displaying an image or a Head Up Display (HUD) capable of displaying an image on a front windshield of the forklift truck.

10. The multi-function camera system according to claim 9, wherein the optical identification code identified by the identification module is any one of one to four dimensional codes.

11. The multi-function camera system according to claim 1, wherein the display device is a monitor capable of displaying an image or a Head Up Display (HUD) capable of displaying an image on a front windshield of the forklift truck.

12. The multi-function camera system according to claim 11, wherein the optical identification code identified by the identification module is any one of one to four dimensional codes.

13. The multi-function camera system according to claim 12, wherein the image processing unit is an Electronic Control Unit (ECU).

14. The multi-function camera system according to claim 1, wherein the image processing unit is an Electronic Control Unit (ECU).

* * * * *